UNITED STATES PATENT OFFICE.

WILLIAM B. RICHARDSON, OF WILMINGTON, NORTH CAROLINA.

BROWN DYE AND PROCESS OF MAKING SAME.

1,412,707.

Specification of Letters Patent. Patented Apr. 11, 1922.

No Drawing. Application filed May 8, 1920. Serial No. 379,963.

*To all whom it may concern:*

Be it known that I, WILLIAM B. RICHARDSON, a citizen of the United States, residing at Wilmington, in the county of New Hanover and State of North Carolina, have invented certain new and useful Improvements in Brown Dyes and Processes of Making Same; and I do hereby declare the following to be a full, clear, and exact description of the invention, such as will enable others skilled in the art to which it appertains to make and use the same.

The present invention relates to the production of dyes by the treatment of di-hydroxy-naphthalene, and in this operation it is preferable to employ the 1-5-di-hydroxy-naphthalene, which may be produced in any suitable manner, and which may readily be obtained in a pure condition. The di-hydroxy-naphthalene is treated with concentrated nitric acid, the reaction mixture being preferably kept cold during the reaction and the mixture, after the addition of nitric acid, preferably being allowed to stand in the cold for several hours or over-night. If a highly concentrated nitric acid is employed, for example, one having a specific gravity of about 1.42, then it is necessary to keep the temperature low during the reaction. If a considerably weaker acid is employed, it is not necessary to keep the reaction mixture cold.

As a specific example of the process, the following is given:

5.5 parts, by weight, of 1-5-di-hydroxy-naphthalene was slowly added with constant stirring to 54.6 parts, by weight, of nitric acid of 1.3 specific gravity. The stirring was continued for an hour, then 7 parts, by weight, of 1.42 specific gravity nitric acid were added and the mixture well stirred. The mixture was then allowed to stand for about thirty minutes. The reaction products were then poured into 100 parts or more of water, the solid reaction product was thereby precipitated, separated from the dilute acid by filtration and washed with water a number of times. A reddish brown product was obtained, whereas the original di-uct hydroxy-naphthalene used was of a somewhat grayish color. During the treatment, it was not necessary to watch the temperature carefully, and the solution warmed up slightly during the operation.

The brownish pulverulent product is insoluble or only very slightly soluble in water, and in dilute nitric and sulfurous acids, but is very soluble in alkali solutions such as ammonia and sodium carbonate. It dissolves or decomposes and goes into solution in nitric acid of 1.42 specific gravity, and is not re-precipitated by the addition of a large quantity of ammonia water. The product does not seem to be entirely uniform, several samples having been tested, giving a percentage of nitrogen between 3.75 and 5.5, and the latter percentage is somewhat lower than the theoretical per cent of nitrogen in mono-nitro-1-5-hydroxy-naphthalene. These analyses were made by standard fertilizer methods, and although they show absolutely that there is as much as 3.75 per cent, they do not absolutely prove that there is not more than 5.5 per cent nitrogen, since some of the nitrogen may have been lost during the analysis.

In a different example of the process, a considerably stronger nitric acid was employed. During this operation it was necessary to cool the mixture during the reaction to prevent decomposition of the product. I am not prepared to give a structural formula of the product but I believe that the same is a nitro-derivative.

The reddish brown material forming the product dyes unmordanted silk a brilliant light brown, dyes unmordanted wool a somewhat darker shade of brown, and dyes tannin-mordanted cotton a grayish brown.

I claim:

1. A dyestuff constituting a reddish-brown solid material capable of dyeing unmordanted silk a brilliant light brown color, capable of dyeing unmordanted wool a slightly darker shade of brown, and capable of dyeing tannin-mordanted cotton a grayish brown color, which dyestuff may be prepared by reacting upon a di-hydroxy-naphthalene with nitric acid.

2. A dyestuff constituting a reddish-brown solid material capable of dyeing unmordanted silk a brilliant light brown color, capable of dyeing unmordanted wool a slightly darker shade of brown, and capable of dyeing tannin-mordanted cotton a grayish brown color, which dyestuff may be prepared by reacting upon 1-5-di-hydroxy-naphthalene with nitric acid.

3. A dyestuff constituting a reddish-brown solid material capable of dyeing unmordanted silk a brilliant light brown color, capable of dyeing unmordanted wool a slightly darker shade of brown, and capable of dyeing tannin-mordanted cotton a grayish brown color, which dyestuff may be prepared by reacting upon 1-5-di-hydroxy-naphthalene with nitric acid, such product containing not less than about 3.75% of nitrogen.

4. A dyestuff constituting a reddish-brown solid material capable of dyeing unmordanted silk a brilliant light brown color, capable of dyeing unmordanted wool a slightly darker shade of brown, and capable of dyeing tannin-mordanted cotton a grayish brown color, which dyestuff may be prepared by reacting upon 1-5-di-hydroxy-naphthalene with nitric acid, such product containing not substantially less than 5.5% of nitrogen.

5. A process of producing a dyestuff which comprises treating a di-hydroxy-naphthalene with nitric acid, and thereafter precipitating the dyestuff.

6. A process of producing a dyestuff which comprises treating 1-5-di-hydroxy-naphthalene with nitric acid of about 1.3 specific gravity, at about ordinary room temperature, and thereafter precipitating the dyestuff.

In testimony whereof I affix my signature in presence of two witnesses.

WILLIAM B. RICHARDSON.

Witnesses:
JOHN J. FURLONG,
H. H. FORD.